United States Patent
Alexander et al.

(10) Patent No.: US 6,404,948 B2
(45) Date of Patent: Jun. 11, 2002

(54) DENSE WDM OPTICAL MULTIPLEXER AND DEMULTIPLEXER

(75) Inventors: Stephen B. Alexander, Millersville; Jean-Luc Archambault, Severna Park; Victor Mizrahi, Columbia; Henry H. Yaffe, Reisterstown, all of MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/770,367

(22) Filed: Jan. 26, 2001

Related U.S. Application Data

(62) Division of application No. 08/927,781, filed on Sep. 11, 1997, now Pat. No. 6,281,997.

(51) Int. Cl.[7] .............................. G02B 6/28; H04J 14/02
(52) U.S. Cl. .............................. 385/24; 385/15; 385/31; 385/37; 385/42; 359/115; 359/124; 359/130
(58) Field of Search .............................. 385/15, 24, 31, 385/37, 42, 33, 34; 359/115, 124, 130

(56) References Cited

U.S. PATENT DOCUMENTS

| | | | | |
|---|---|---|---|---|
| 5,414,548 A | * | 5/1995 | Tachikawa et al. | ......... 359/130 |
| 5,712,717 A | * | 1/1998 | Hamel et al. | ................ 359/130 |
| 5,959,749 A | * | 9/1999 | Danagher et al. | ........... 359/124 |
| 5,974,207 A | * | 10/1999 | Aksyuk et al. | ................ 385/24 |
| 6,097,861 A | * | 8/2000 | Kim et al. | ..................... 385/27 |
| 6,160,931 A | * | 12/2000 | Asakura | ....................... 385/24 |
| 6,281,997 B1 | * | 8/2001 | Alexander et al. | .......... 359/130 |

\* cited by examiner

*Primary Examiner*—Brian Healy
(74) *Attorney, Agent, or Firm*—David L. Soltz; Michael R. Cammarata

(57) ABSTRACT

In accordance with the present invention, optical channels to be demultiplexed are supplied to first and second optical fibers via an optical splitter. Low loss interference filters, for example, coupled to the first and second optical fibers, select respective groups of channels. Each group of channels is next demultiplexed with sub-demultiplexers into individual channels, each of which is then sensed with a corresponding photodetector. Although the optical splitter introduces an optical power loss at the input to the demultiplexer, the interference filters and sub-demultiplexers create little additional loss. As a result, the total power loss associated with the present invention is significantly less than that obtained with a conventional n channel demultiplexer based on a 1×n splitter. Accordingly, large numbers of channels, e.g., in excess of forty can be readily demultiplexed and detected.

25 Claims, 12 Drawing Sheets

DENSE WDM OPTICAL MULTIPLEXER AND DEMULTIPLEXER

This application is a divisional application of U.S. Ser. No. 08/927,781 filed Sep. 11, 1997, which issued as U.S. Pat. No. 6,281,997 on Aug. 28, 2001.

FIELD OF THE INVENTION

The present invention is directed to an optical demultiplexer for demultiplexing optical signals in a dense wavelength division multiplexed system.

Optical communication systems are a substantial and fast growing constituent of communication networks. The expression "optical communication system," as used herein, relates to any system which uses optical signals to convey information across an optical waveguiding medium, for example, an optical fiber. Such optical systems include but are not limited to telecommunication systems, cable television systems, and local area networks (LANs). Currently, the many optical communication systems are configured to carry an optical channel of a single wavelength over one or more optical waveguides. To convey information from plural sources, time-division multiplexing is frequently employed (TDM). In time-division multiplexing, a particular time slot is assigned to each signal source, the complete signal being constructed from the portions of the signals collected from each time slot. While this is a useful technique for carrying plural information sources on a single channel, its capacity is limited by fiber dispersion and the need to generate high peak power pulses.

While the need for communication services increases, the current capacity of existing waveguiding media is limited. Although capacity may be expanded e.g., by laying more fiber optic cables, the cost of such expansion is prohibitive. Consequently, there exists a need for a cost-effective way to increase the capacity of existing optical waveguides.

Wavelength division multiplexing (WDM) has been explored as an approach for increasing the capacity of existing fiber optic networks. WDM systems typically include a plurality of transmitters, each respectively transmitting signals on a designated one of a plurality of channels or wavelengths. The channels are combined by a multiplexer at one end terminal and transmitted on a single fiber to a demultiplexer at another end terminal where they are separated and supplied to respective receivers.

Recently, dense WDM (DWDM) systems transmitting 8 channels on a single fiber have been proposed. These systems can include a demultiplexer having a 1×8 optical splitter, which receives the 8 channels on an input fiber, and outputs the channels on each of 8 outputs. The power level on each of the outputs, however, is approximately ⅛ the input power level. Optical components are respectively coupled to the outputs of the 1×8 splitter for outputting a corresponding one of the 8 channels, which introduce additional loss.

Although 8 channel WDM systems provide improved capacity, the need for additional capacity has increased with growing internet traffic and demand for multimedia services. Thus, DWDM systems having higher channel counts are currently being developed. In high channel count systems, however, it is difficult to multiplex and demultiplex a large number of optical channels. For example, in a 40 channel DWDM system, a 1×40 splitter would be inadequate to demultiplex each of the channels because the power level at each output of such a splitter would be insufficient to maintain an adequate signal to noise ratio. As a result, the transmitted channels cannot be adequately detected. On the other hand, although an optical amplifier could be used to increase the power on the input of the 1×40 splitter, such an amplifier can be difficult to manufacture, and would fail to provide the requisite optical power per channel at higher channel counts. Moreover, if amplifiers were to be provided at each of the outputs of the 1×40 splitter, the cost of the demultiplexer would be excessive.

Thus, there is a need for a multiplexer and demultiplexer suitable for incorporation into a high channel count DWDM system which minimizes power loss and enables adequate detection of the transmitted channels. There is also a need for a scaleable DWDM system which can readily accommodate additional channels with minimal expense.

SUMMARY OF THE INVENTION

Consistent with the present invention, an optical device is provided comprising an optical splitter having an input and first and second outputs. The input of the optical splitter is coupled to an input optical path, which carries a plurality of optical channels. Each of the optical channels has a respective wavelength. The first output of the optical splitter being coupled to a first output optical path, and the second output being coupled to a second output optical path, with the first and second output optical paths each carrying the plurality of optical channels.

The optical device consistent with the present invention further comprises a first optical filtering element coupled to the first output optical path for selecting a first group of said plurality of optical channels; and a second optical filtering element coupled to the second output optical path for selecting a second group of said plurality of optical channels. A first optical demultiplexer is coupled to the first optical filtering element and includes a plurality of outputs. A corresponding one of the first group of channels appearing on a respective one of the plurality of outputs of said first optical demultiplexer. Further, a second optical demultiplexer is coupled to the second optical filtering element. The second optical demultiplexer comprises a plurality of outputs, a corresponding one of the second group of channels appearing on a respective one of the plurality of outputs of the second optical demultiplexer.

BRIEF DESCRIPTION OF THE DRAWINGS

Advantages of the present invention will be apparent from the following detailed description of the presently preferred embodiments thereof, which description should be considered in conjunction with the accompanying drawings in which.

DETAILED DESCRIPTION

In accordance with the present invention, optical channels to be demultiplexed are supplied to first and second optical fibers via an optical splitter. Low loss interference filters, for example, coupled to the first and second optical fibers, select respective groups of channels. Each group of channels is next demultiplexed with sub-demultiplexers into individual channels, each of which is then sensed with a corresponding photodetector. Although the optical splitter introduces an optical power loss at the input to the demultiplexer, the interference filters and sub-demultiplexers create little additional loss. As a result, the total power loss associated with the present invention is significantly less than that obtained with a conventional n channel demultiplexer based on a 1×n splitter. Accordingly, large numbers of channels, e.g., in excess of forty can be readily demultiplexed and detected.

Figure 1:
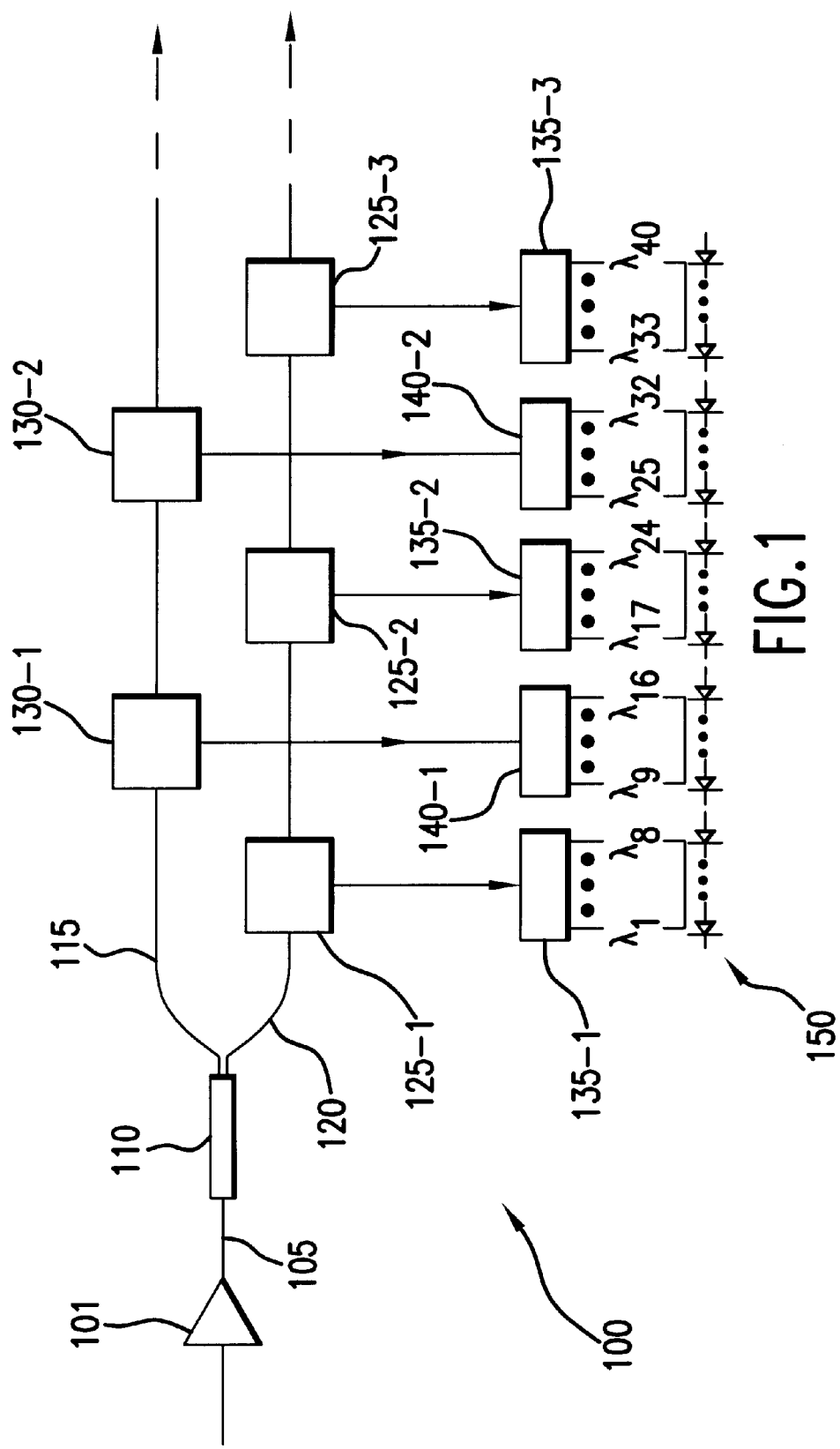
FIG. 1 illustrates a schematic diagram of an optical demultiplexer in accordance with the present invention.

Turning to the drawings in which like reference characters indicate the same or similar elements in each of the several views, FIG. 1 illustrates optical demultiplexer 100 consistent with the present invention. As discussed in greater detail below, the exemplary demultiplexer illustrated in FIG. 1 demultiplexes 40 channels. The present invention, however, is not limited to this number of channels. Rather, the present invention is applicable to demultiplexers that can separate any appropriate number of optical channels.

Returning to FIG. 1, optical demultiplexer 100 receives, for example, a plurality of multiplexed optical channels $\lambda_1 - \lambda_{40}$ on input optical fiber 105. The multiplexed channels are emitted by laser transmitters (not shown) coupled to optical fiber 105. The multiplexed channels are supplied to the input of optical splitter 110, which supplies channels $\lambda_1 - \lambda_{40}$ to first and second output fibers 115 and 120, respectively. Optionally, optical amplifier 101 may be provided at the input of coupler 110 in order to offset any loss introduced by splitter 110. Alternatively, the loss imposed by splitter 110 can be compensated by coupling optical amplifiers to output fibers 115 and 120.

As further shown in FIG. 1, first optical filtering elements 125-1 to 125-3 are coupled to first output fiber 120, and second filtering elements 130-1 and 130-2 are coupled to second output fiber 115. Each of these filtering elements typically includes an interference filter commercially available from JDS Fitel or DiCon, for example.

Figure 2:
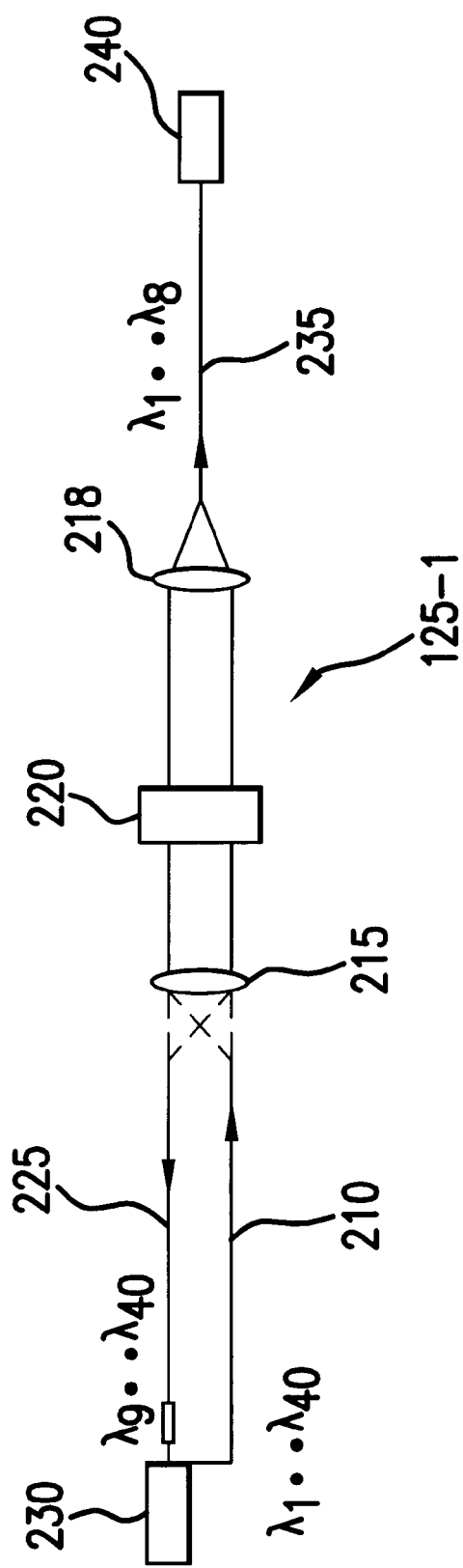
FIG. 2 illustrates a schematic diagram of an interference filter.

A simplified diagram of filtering element 125-1 incorporating an interference filter, for example, is illustrated in FIG. 2. Filtering element 125-1 receives channels $\lambda_1 - \lambda_{40}$ on input fiber 210 having an end portion spaced from graded refractive index (GRIN) lens 215. As a result, light emitted from the end portion diverges prior to impinging on lens 215. Channels $\lambda_1 - \lambda_{40}$ are collimated by lens 215 and directed toward dielectric thin film filter 220. Thin film filter 220 includes a substrate coated with a plurality of thin dielectric films of appropriate thickness and number to pass, in this case, channels $\lambda_1 - \lambda_8$, and reflect channels $\lambda_9 - \lambda_{40}$. Channels $\lambda_1 - \lambda_8$ are thus transmitted to GRIN lens 218 where they are focused onto an end portion of output fiber 235 and transmitted to a corresponding sub-demultiplexer via output port 240 of filtering element 125-1. Channels $\lambda_9 - \lambda_{40}$, however, are reflected back to GRIN lens 215, focused onto fiber 225 and output through port 230 to filtering element 125-2, which along with filtering element 125-3, typically has a similar construction as filtering element 125-1.

Figure 3:
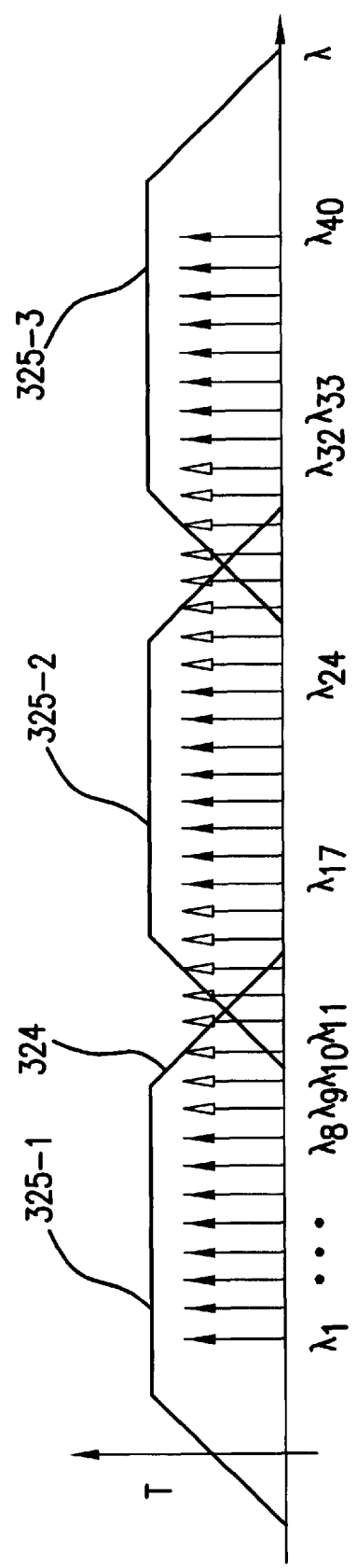
FIG. 3 illustrates transmittance characteristics of filtering elements 125-1, 125-2 and 125-3 shown in FIG. 1.

The transmittance vs. wavelength characteristics of filtering elements 125-1 to 125-3 are shown in FIG. 3. Transmittance band 325-1 of filtering element 125-1 has a relatively high transmittance over a range of wavelengths including the first eight channels, $\lambda_1 - \lambda_8$. As noted above, therefore, these channels are transmitted toward an output port of filtering element 125-1. It should be noted, however, that channels $\lambda_9 - \lambda_{11}$, for example, are also transmitted, but only partially, since they lie in the roll-off region 324 of transmittance band 325-1. Remaining channels $\lambda_{12} - \lambda_{40}$, as well as channels $\lambda_9 - \lambda_{11}$ at a substantially reduced power level, are reflected to filtering element 125-2 having high transmittance band 325-2. As a result, channels $\lambda_{17} - \lambda_{24}$ are transmitted toward the output port of filtering element 125-2. As further shown in FIG. 3, however, channels $\lambda_{25} - \lambda_{27}$, for example, adjacent $\lambda_{17} - \lambda_{24}$ are also transmitted, but to a lesser extent. Remaining channels $\lambda_{28} - \lambda_{40}$ are reflected and output to filtering element 125-3 of which channels $\lambda_{33} - \lambda_{40}$ fall within high transmittance band 325-3 and are thus passed to an output port of filtering element 125-3. Channels $\lambda_{28} - \lambda_{31}$, however, are partially transmitted.

As further shown in FIG. 1, channel groups $\lambda_1 - \lambda_8$, $\lambda_{17} - \lambda_{24}$, and $\lambda_{33} - \lambda_{40}$ are respectively directed to sub-demultiplexers 135-1, 135-2 and 135-3 where further demultiplexing is performed to output individual channels on corresponding output ports. These output ports, in turn, are coupled to respective ones of photodiodes 150 where the channels are converted into electrical signals for processing by appropriate circuitry (not shown). The term sub-demultiplexer is used herein to describe an optical apparatus that demutliplexes the groups of channels respectively output from the filtering elements. Sub-demultiplexers 135-1, 135-2 and 135-3 are discussed in greater detail below.

As noted above, channels lying outside the high transmittance bands of filtering elements 125-1, 125-2 and 125-3 are only partially reflected due to the relatively broad roll-off regions of the transmittance characteristics of interference filters, for example. Accordingly, channels adjacent the intended channel sub-groups incur a significant amount of power loss and cannot be effectively demultiplexed. These channels are therefore supplied by filtering elements 130-1 and 130-2 coupled to second output fiber 115, as discussed in greater detail below with reference to FIG. 4.

Figure 4:
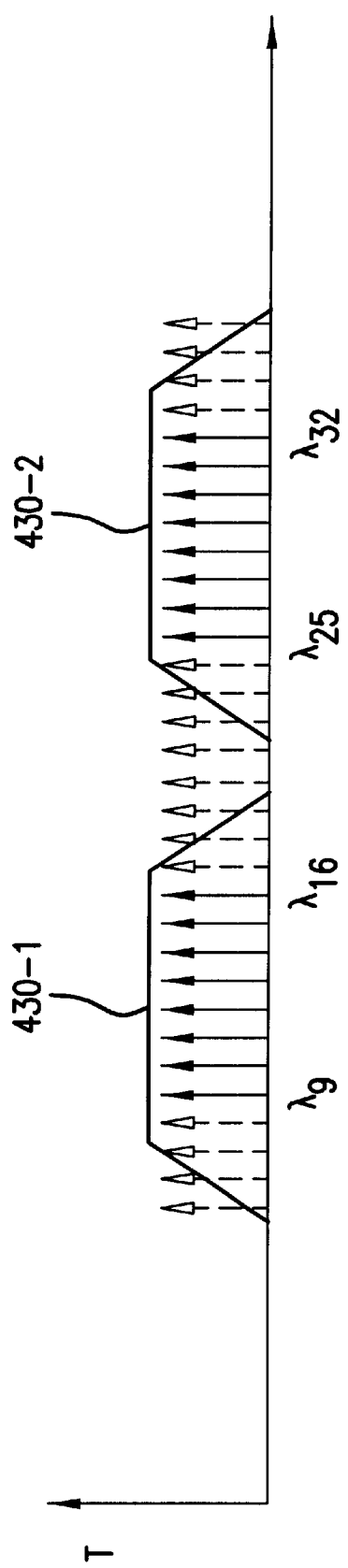
FIG. 4 illustrates transmittance characteristics of filtering elements 430-1 and 430-2 shown in FIG. 1.

As shown in FIG. 4, filtering element 130-1 has high transmittance band 430-1 extending over wavelengths $\lambda_9 - \lambda_{16}$. Filtering element 130-1 typically has a similar construction to filtering element 125-1, and therefore transmits channels $\lambda_9 - \lambda_{16}$ for output to corresponding sub-demultiplexer 140-1 and further demultiplexing. Remaining channels $\lambda_1 - \lambda_8$ and $\lambda_{17} - \lambda_{40}$ are reflected to filtering element 130-2 having high transmittance band 430-2 encompassing channels $\lambda_{25} - \lambda_{32}$. Accordingly, channels $\lambda_{25} - \lambda_{32}$ are transmitted through filtering element 130-2 and directed toward sub-demultiplexer 140-2 for further demultiplexing into individual channels.

Channels lying adjacent the high transmittance bands 430-1 and 430-2, like those channels discussed previously adjacent high reflectance bands 325-1 to 325-3, are partially transmitted by filtering elements 130-1 and 130-2 and are thus difficult to detect after further demultiplexing. These channels, however, lie within the high transmittance bands of filtering elements 125-1 to 125-3 and are thus demultiplexed through sub-demultiplexers 135-1 to 135-3, respectively, as noted above. Therefore, in the presently described example of the present invention, first output fiber 120, filtering elements 125-1 to 125-3 and corresponding sub-demultiplexers 135-1 to 135-3, serve to demultiplex channels $\lambda_1$–$\lambda_8$, $\lambda_{17}$–$\lambda_{24}$ and $\lambda_{33}$–$\lambda_{40}$, respectively. Additionally, second output fiber 120, filtering elements 130-1 and 130-2 and corresponding sub-demultiplexers 140-1 and 140-2 serve to demultiplex channels $\lambda_9$–$\lambda_{16}$ and $\lambda_{25}$–$\lambda_{32}$, respectively. Accordingly, alternating groups of channels are respectively selected by filtering elements 125-1 to 125-3 and 135-1 to 135-3.

Alternatively, if only 40 channels are to be separated by the demultiplexer in accordance with the present invention, filtering elements 130-2 and 125-3 can be omitted and sub-demultipelxers 140-2 and 135-3 can be coupled directly to the outputs of filtering elements 130-1 and 125-2, respectively.

Filtering elements 125-1 to 125-3, 130-1 and 130-2 introduce little power loss to the selected sub-groups of channels. For example, the power loss associated with the channels reflected by the filtering elements is typically about 0.5 dB, and the loss associated with the channels transmitted through the filtering elements is about 0.7 dB. Thus, the overall loss of the demultiplexer in accordance with the present invention is significantly reduced.

It is noted that as the channels propagate down one of output fibers 115 or 120 in FIG. 1, the transmission loss through each filtering element can accumulate. However, since the loss associated with each filtering element is so low, channels can pass through four filtering elements along one of output fibers 115 and 120, and incur less than 3 dB of loss. Accordingly, additional channels can be demultiplexed with little additional loss simply by concatenating additional filtering elements with fiber patch cord, for example, between adjacent couplers. Alternatively, filtering elements can be easily added by coupling the output of one filtering element to one end of an optical fiber via a first fiber optic coupler and coupling the other end of the optical fiber to another filtering element via a second fiber optic coupler. Thus, the demultiplexer in accordance with the present invention is readily expandable and upgradable to accommodate more channels with minimal expense and relatively little loss.

Figure 5:
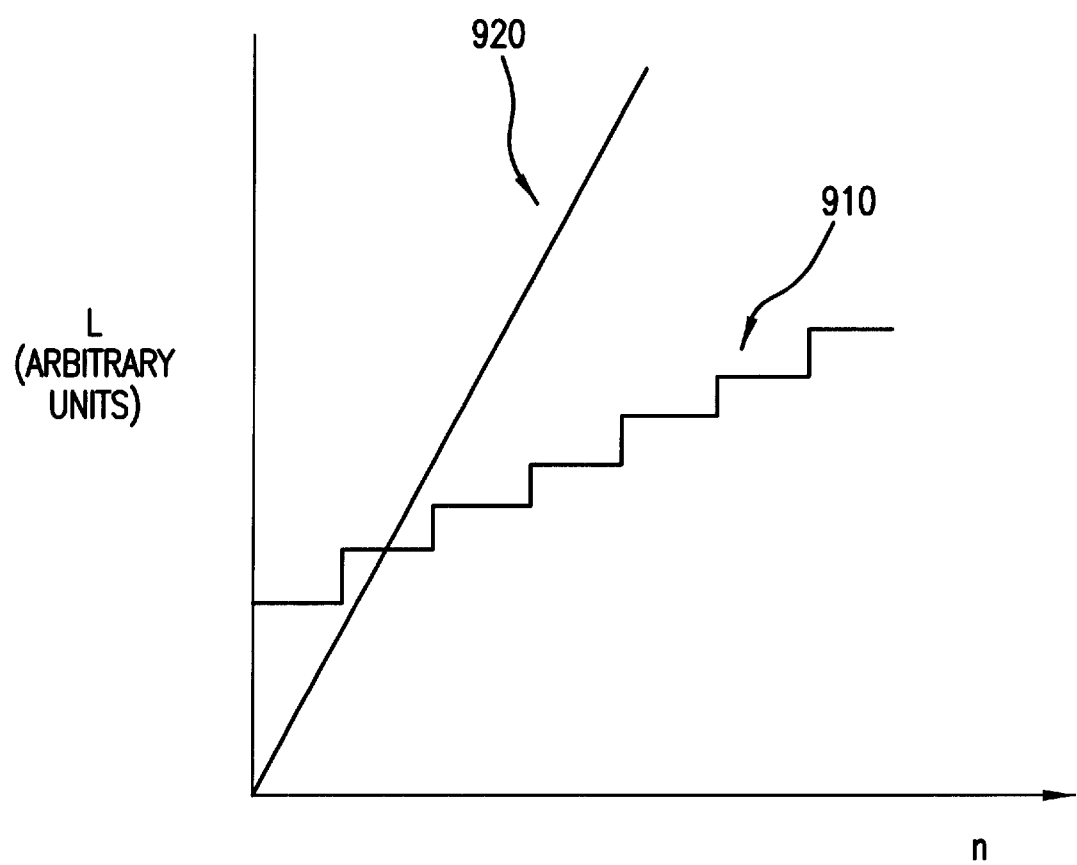
FIG. 5 illustrates plots of loss vs. channel count for the present invention and a conventional demultiplexer.

FIG. 5 illustrates loss L as a function of channel count n in accordance with the present invention (curve 910) and a conventional 1×n splitter based demultiplexer (curve 920). As seen in FIG. 5, at low channel counts, the loss associated with the present invention is higher than the conventional demultiplexer. This is due to the loss introduced by the 1×2 splitter 110, which imposes a minimum loss in the demultiplexer. At higher channel counts, however, the loss associated with the conventional demultiplexer increases linearly with n (curve 920). On the other hand, the loss associated with the present invention (curve 910) is stepped and increases at a much more gradual rate due, at least in part, to the low loss of the filtering elements. Therefore, at higher channel counts, channels demultiplexed in accordance with the present invention experience less loss than those demultiplexed with a conventional 1×n splitter.

Figure 6:
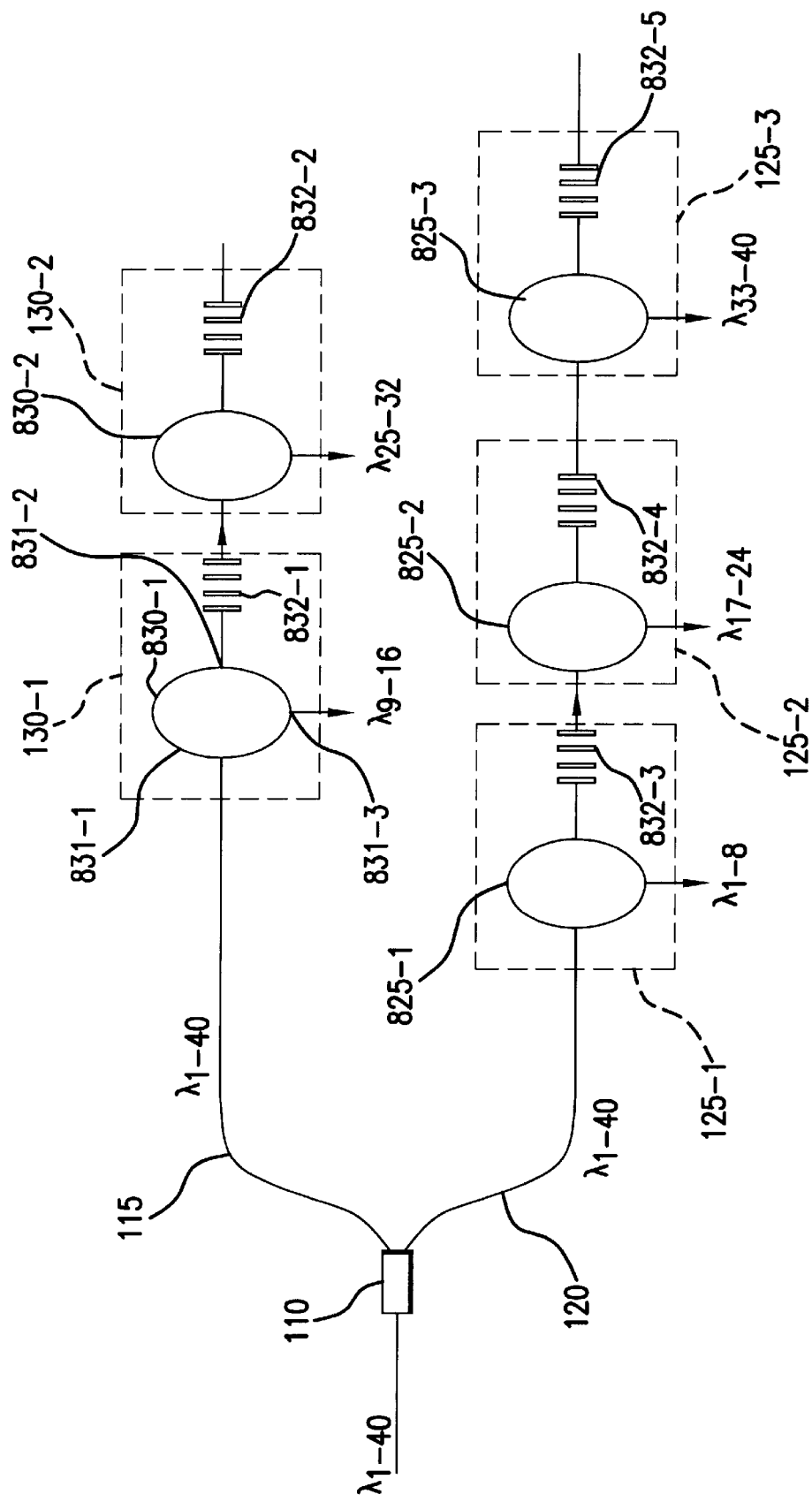
FIG. 6 illustrates an additional embodiment of the present invention.

FIG. 6 illustrates an alternative embodiment in which each filtering element constitutes a combination of a circulator and grating. In particular, filtering element 130-1 includes a circulator 830-1 receiving channels $\lambda_{1-40}$ at a first circulator port 831-1 coupled to output fiber 115. These channels are circulated to port 831-2 and output to in-fiber Bragg grating 832-1, which is configured to have a high reflectivity band that coincides with the band of channels $\lambda_{9-16}$. Accordingly, channels $\lambda_{9-16}$ are reflected back to port 831-2 while the remaining channels are transmitted to circulator 830-2. Channels $\lambda_{9-16}$ are then circulated to output port 831-3 and supplied to a corresponding sub-demultiplexer. In a similar fashion circulators 830-2, 825-1, 825-2 and 825-3 output channel groups $\lambda_{25-32}$, $\lambda_{1-8}$, $\lambda_{17-24}$ and $\lambda_{33-40}$ in conjunction with in-fiber Bragg gratings 832-2, 832-3, 832-4, and 832-5, respectively.

Typically, in-fiber Bragg gratings 832-3, 832-4 and 832-5 reflect successively lower bands or wavelengths, such that the wavelengths in channel group $\lambda_{1-8}$ are greater than the wavelengths in channel group $\lambda_{17-24}$, and the wavelengths in channel group $\lambda_{17-24}$ are greater than the wavelengths in channel group $\lambda_{33-40}$. Further, in-fiber Bragg gratings 831-1 and 832-2 reflect successively lower bands of wavelengths. As a result, the demultiplexer shown in FIG. 6 avoids cladding or radiation mode loss.

Examples of sub-demultiplexers will next be described with reference to FIGS. 7–10. Although exemplary configurations are discussed in detail with respect to sub-demultiplexer 133-1, it is understood that the remaining sub-demultiplexers described above can have a similar structure. Moreover, the present invention is not limited to these specific sub-demultiplexer configurations nor the specific number of inputs and outputs disclosed. Rather, it is understood that any optically demultiplexing component capable of demultiplexing a group of channels can be used.

Figure 7:
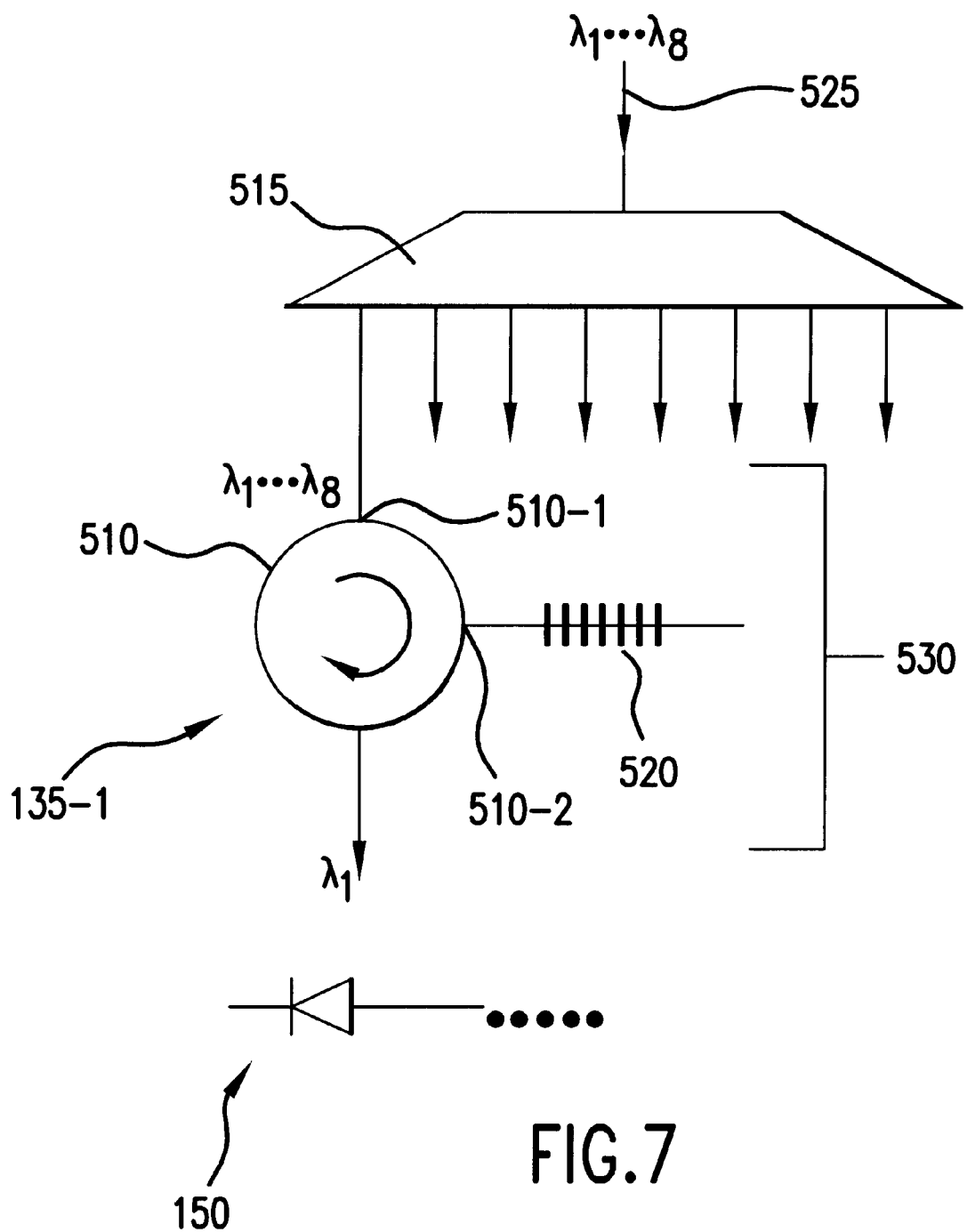
FIG. 7 illustrates an example of a sub-demultiplexer.

FIG. 7 illustrates a first exemplary construction of sub-demutliplexer 133-1. As shown in FIG. 7, sub-demultiplexer 133-1 receives channels , at an input 525 of a 1×8 splitter 515, commercially available from IOT, for example. Splitter 515 has eight outputs, each of which supplying channels $\lambda_1$–$\lambda_8$ to a corresponding one of eight optical selectors 530. Splitter 515, as well as splitter 110, may include a waveguide doped with an optically active material, such as erbium. Such a waveguide may further be optically pumped so that splitter 515 has reduced loss or provides optical gain.

In FIG. 7, only one of the selectors is shown including a three port circulator 510 having a first port 510-1 for receiving channels $\lambda_1$–$\lambda_8$ from one of the outputs of splitter 515. These channels are transmitted to in-fiber Bragg grating 520 via second port 510-2 of circulator 510. Typically, in-fiber Bragg grating 520 has a reflectance characteristic as a function of wavelength such that a reflectivity maximum is obtained at a desired channel or wavelength, e.g., $\lambda_1$. Thus, only channel $\lambda_1$ is reflected back to second port 510-2 and circulated to third circulator port 510-3, which outputs channel $\lambda_1$ to one of photodiodes 150 for subsequent detection and further processing. Likewise, the in-fiber Bragg gratings in the remaining selectors have reflectivity maxima that respectively reflect a corresponding one of each of remaining wavelengths $\lambda_2$–$\lambda_8$ for output to one of photodiodes 150.

Figure 8:
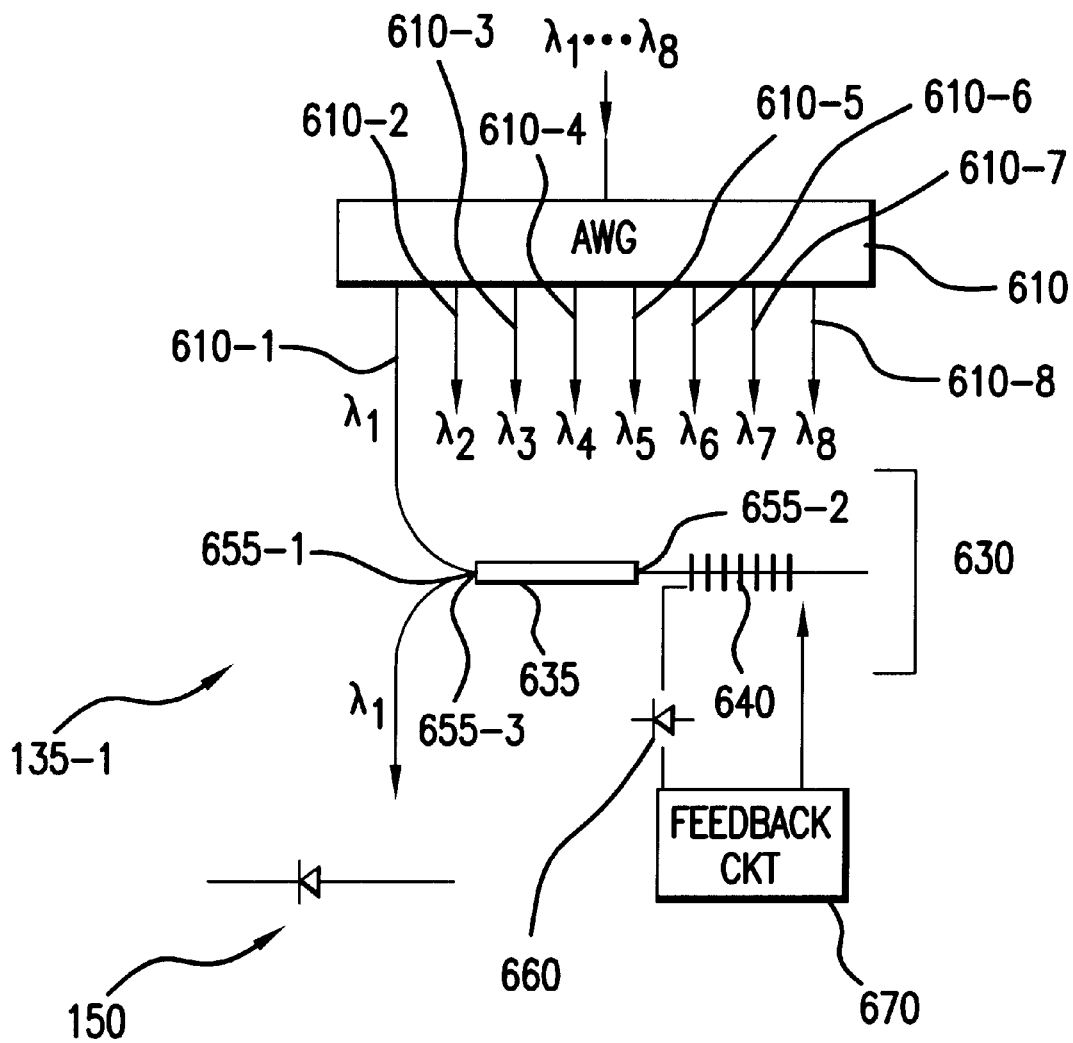
FIG. 8 illustrates an additional example of a sub-demultiplexer.

FIG. 8 illustrates an alternative construction for sub-demutliplexer 133-1. Here, the channel group $\lambda_1$–$\lambda_8$ is supplied to a planar arrayed waveguide grating (AWG) 610 or dielectric thin film demultiplexer, which supplies a respective channel on each of outputs 610-1 to 610-8. If the spacing between adjacent ones of channels $\lambda_1$–$\lambda_8$ is relatively narrow, AWG 610 can introduce an unacceptably high level of undesired cross-talk. Accordingly, additional filtering may be required. Thus, a selector 630 is further illustrated in FIG. 8 to isolate a single channel, e.g., $\lambda_1$, and remove any cross-talk. In this case, selector 630 includes a coupler 655 receiving substantially channel $\lambda_1$ at a first port 655-1. The input light is next supplied to in-fiber Bragg grating 640 through second port 655-2. In-fiber Bragg grating 640 substantially reflects only channel $\lambda_1$, while passing other wavelengths. Thus, channel $\lambda_1$ is reflected back to second port 655-2 and output to one of photodiodes 150 via third output port 655-3 of coupler 655.

As further shown in FIG. 8, feedback circuit 670 is optionally provided to insure that grating 640 reflects at the intended wavelengths. As is generally understood, an in-fiber Bragg grating typically includes a periodic variation of index of refraction, with the spacing between refractive index peaks defining, in part, the wavelength to be reflected by the grating. Variations in the wavelength of light reflected by grating 640 can be sensed with photodiode 660, which supplies an electrical signal to a feedback circuit 670. Feedback circuit 670, in turn, generates an appropriate voltage signal to adjust a temperature regulator coupled to grating 640. Since the grating refractive index spacing changes with temperature, the temperature of the grating is set by feedback circuit 670 to alter the grating spacing so that grating 640 reflects a desired wavelength.

Figure 9:
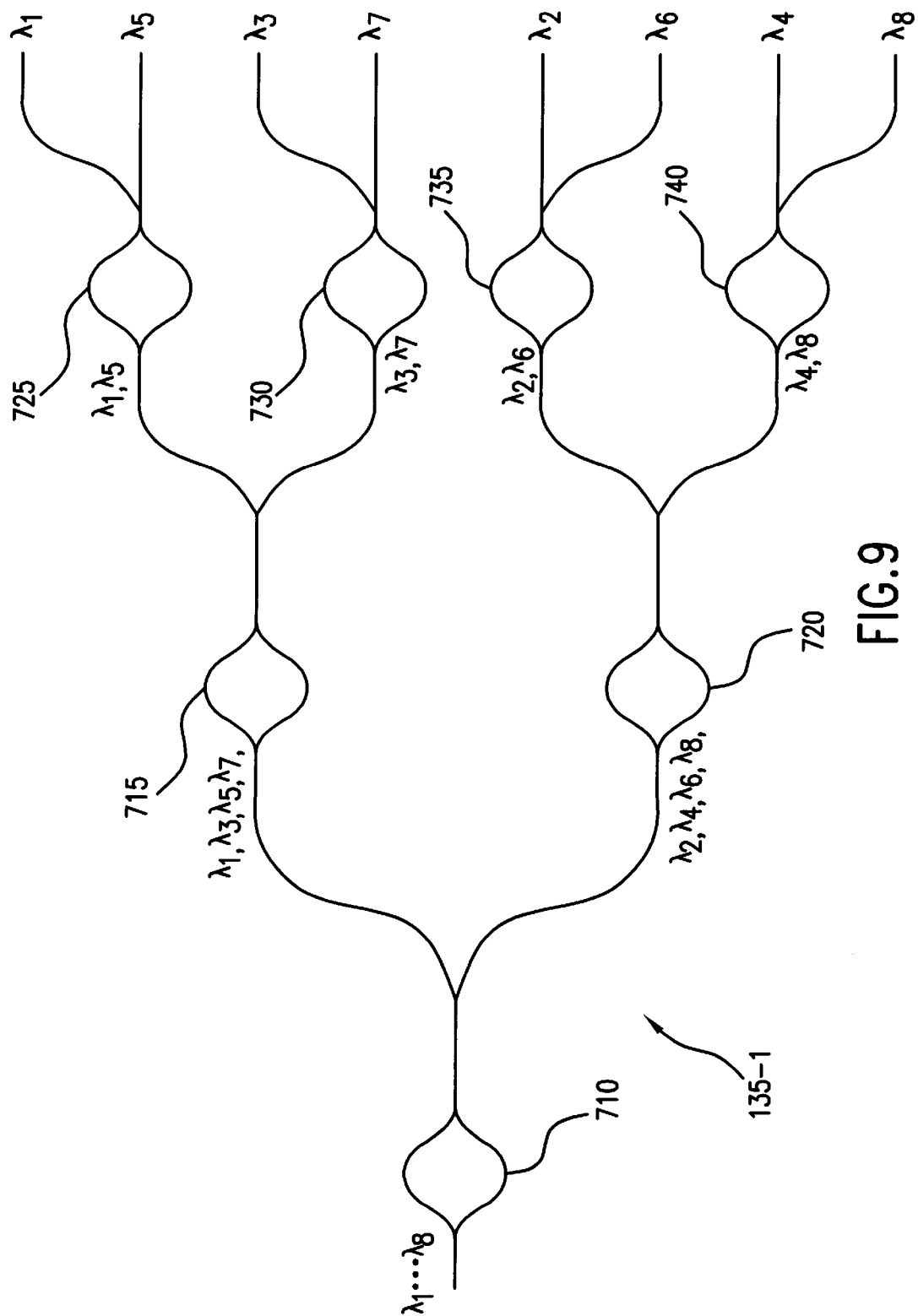
FIG. 9 illustrates a further example of a sub-demultiplexer.

FIG. 9 illustrates a further exemplary construction of sub-demultiplexer 133-1. In this instance, sub-demultiplexer 133-1 comprises a plurality of Mach-Zehnder interferometers. It is known that Mach-Zehnder interferometers, which include optical waveguides of varying lengths, can be used to separate wavelengths (see for example, published European Patent Application EP0482461). Accordingly, as shown in FIG. 9, Mach-Zehnder interferometers can be cascaded to separate a group of wavelengths. For example, Mach-Zehnder interferometer 710 separates input channels $\lambda_1$–$\lambda_8$ into sub-groups of channels $\lambda_{1,3,5,7}$ and $\lambda_{2,4,6,8}$, respectively. Channel sub-group $\lambda_{1,3,5,7}$ is supplied to Mach-Zehnder interferometer 715 and channel sub-group $\lambda_{2,4,6,7}$ is supplied to Mach-Zehnder interferometer 720. As further shown in FIG. 9, Mach-Zehnder interferometers 715 and 720 further break down these channel sub-groups to channel pairs $\lambda_{1,5}$, $\lambda_{3,7}$, $\lambda_{2,6}$, and $\lambda_{4,8}$, which are further demultiplexed into individual channels by Mach-Zehnder interferometers 725, 730, 735 and 740, respectively.

Figure 10:
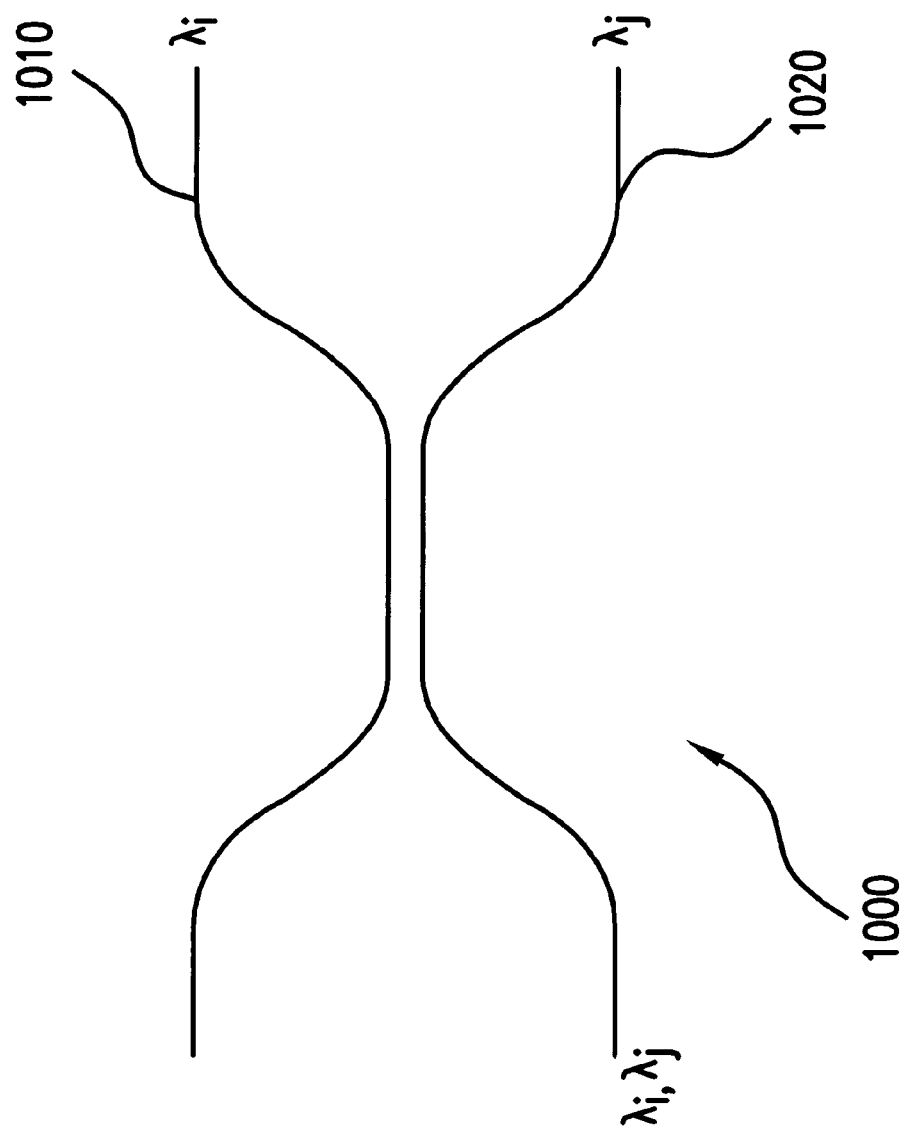
FIG. 10 illustrates a fiber optic coupler demutliplexer for separating two wavelengths.

Fiber optical couplers, commercially available from Applied Fiber Optics, Inc. and Gould, for example, can also be used to demultiplex the groups of channels supplied by the filtering elements. Fiber optic coupler 1000 is illustrated in FIG. 10 in which two wavelengths $\lambda_i$ and $\lambda_j$ are separated and supplied on respective outputs 1010 and 1020. A plurality of such fiber optic couplers can be cascaded in a manner similar to that shown in FIG. 9 to thereby demultiplex a plurality of wavelengths within a given group of channels. If necessary, selectors 530 or 630 may be provided at the outputs of Mach-Zehnder interferometers 725, 730, 735 and 740 of FIG. 7, or at the outputs of the cascaded fiber optic couplers 1000, in order to reject any extraneous wavelengths, e.g., cross-talk.

Figure 11:
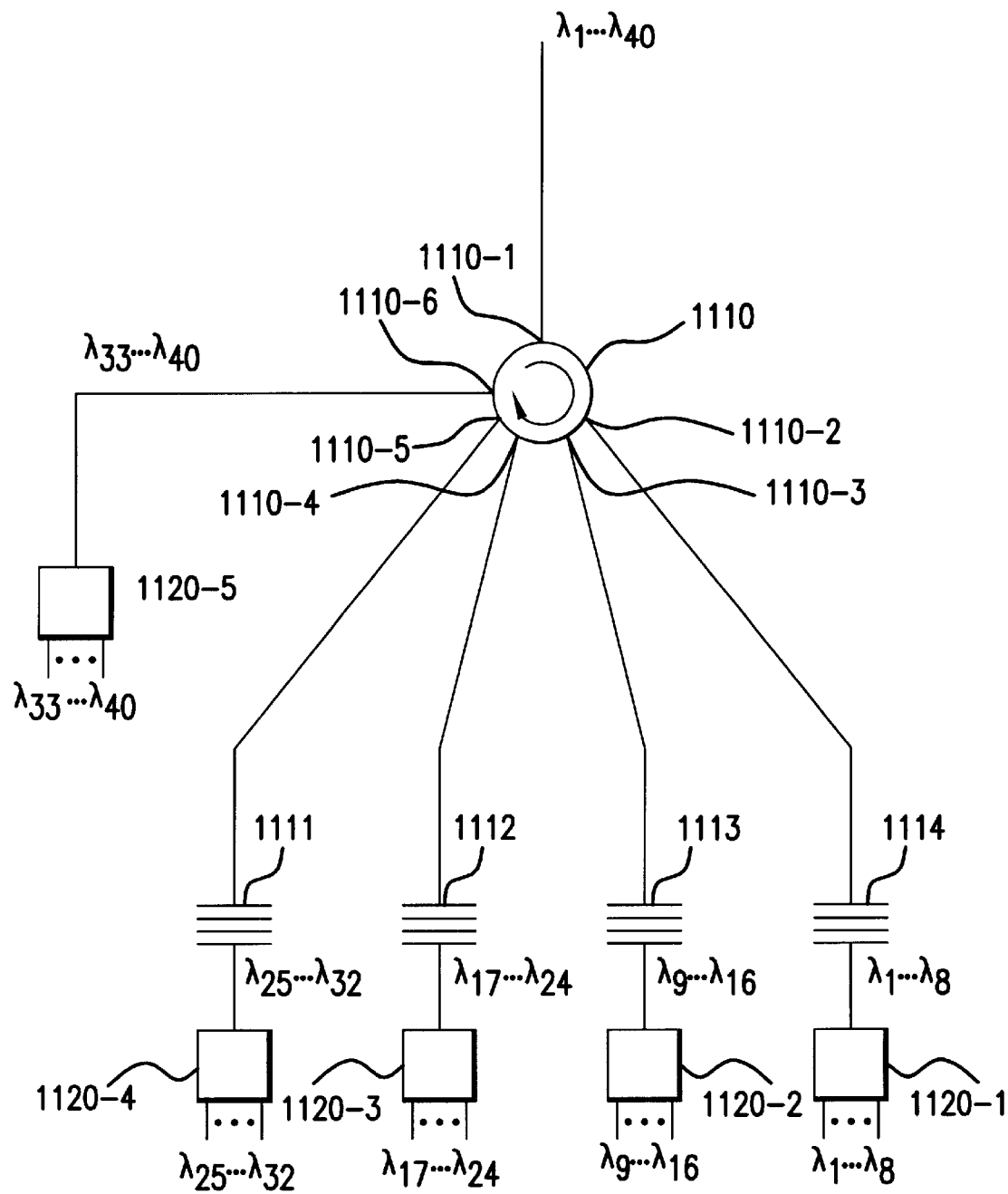
FIG. 11 illustrates an additional embodiment of the present invention.

FIG. 11 shows an alternative embodiment of the present invention, whereby splitter 110 and filtering elements 125-1 to 125-3, 135-1 and 135-2 are replaced by five port circulator 1110 and in-fiber Bragg gratings 1111 to 1114. Channels $\lambda_{1-40}$ are supplied to a first port 1110-1 of circulator 1110 and are output through port 1110-2. In-fiber Bragg grating 1114 is configured to transmit channels $\lambda_{1-8}$ and reflect channels $\lambda_{9-40}$. Accordingly, channels $\lambda_{1-8}$ are supplied to sub-demultiplexer 1120-1 for further demultiplexing while channels $\lambda_{9-40}$ are reflected back to second port 1110-2 and output to port 1110-3. In-fiber Bragg grating 1113, which is coupled to second port 1110-3, is configured to reflect channels $\lambda_{17-40}$ and transmit channels $\lambda_{9-16}$. As a result, channels $\lambda_{9-16}$ are passed to sub-demultiplexer 1120-2 for further demultiplexing and channels $\lambda_{17-40}$ are reflected back to port 1110-3 and output through port 1110-4.

In-fiber Bragg gratings 1112 and 1111, coupled to corresponding ports 1110-4 and 1110-5, are configured to transmit channel groups $\lambda_{17-24}$ and $\lambda_{25-32}$, respectively, and reflect the remaining channels. Thus, channel groups $\lambda_{17-24}$ and $\lambda_{25-32}$ are selected in a manner similar to that described above, and supplied to corresponding sub-demultiplexers 1120-3 and 1120-4 for further demultiplexing. In addition, channels $\lambda_{33-40}$ are output through port 1110-6 and supplied to sub-demultiplexer 1120-5 for further demultiplexing. Typically, sub-demultiplexers 1120-1 to 1120-5 have a structure similar to that shown in FIG. 7.

Figure 12:
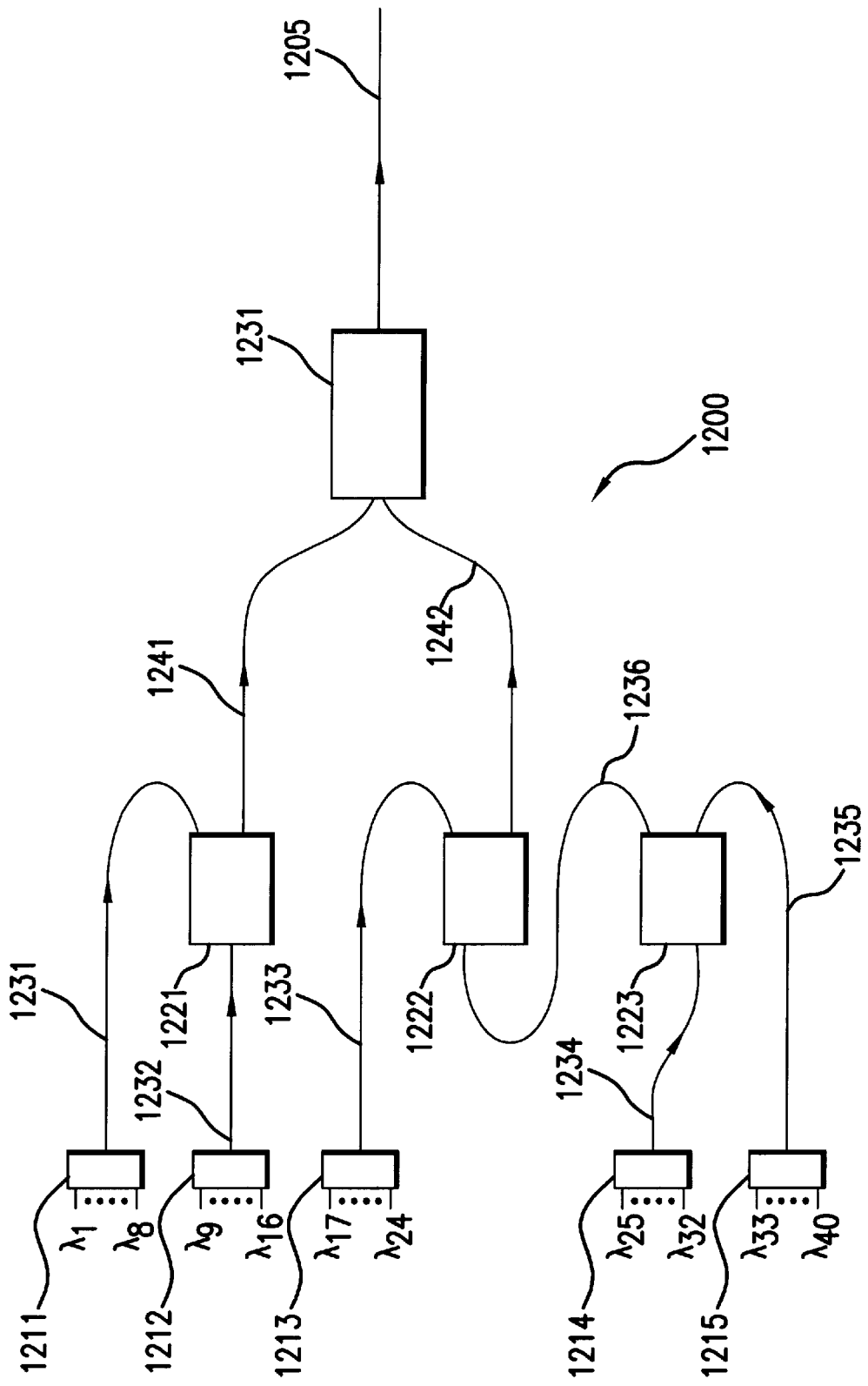
FIG. 12 illustrates an optical multiplexer in accordance with the present invention.

FIG. 12 illustrates optical multiplexer 1200 in accordance with the present invention for multiplexing forty channels onto a single fiber 1205. As seen in FIG. 12, each channel input to multiplexer 1200 is supplied on a respective input optical communication path or line to one of optical combiners 1211 to 1215. Optical combiners 1211 to 1215 are similar to optical splitter 515, but the inputs and outputs are reversed. As further shown in FIG. 12, combiner 1211 receives channels $\lambda_1$–$\lambda_8$ on respective input lines and combines these channels as a channel group onto a single output line 1231. Likewise, channel groups $\lambda_9$–$\lambda_{16}$, $\lambda_{17}$–$\lambda_{24}$, $\lambda_{25}$–$\lambda_{32}$, and $\lambda_{33}$–$\lambda_{40}$ are output from combiners 1212, 1213, 1214 and 1215 on lines 1232, 1233, 1234 and 1235, respectively. Lines 1231 and 1232 are fed to filtering element 1221, commercially available from JDS Fitel or E-Tek, for example, for combining channel groups $\lambda_1$–$\lambda_8$ and $\lambda_9$–$\lambda_{16}$ onto line 1241. Lines 1234 and 1235 are coupled to filtering element 1223, which combines $\lambda_{25}$–$\lambda_{32}$ and $\lambda_{33}$–$\lambda_{40}$ onto a single line 1236, and lines 1233 and 1236 are fed to filtering element 1222, which combines channel groups $\lambda_{17}$–$\lambda_{24}$, $\lambda_{25}$–$\lambda_{32}$, $\lambda_{33}$–$\lambda_{40}$ onto a single line 1242. Lines 1241 and 1242 are connected to coupler 1231, similar in construction to splitter 110 but having the inputs and outputs reversed, which combines channel groups $\lambda_1$–$\lambda_8$, $\lambda_9$–$\lambda_{16}$, $\lambda_{17}$–$\lambda_{24}$, $\lambda_{25}$–$\lambda_{32}$, and $\lambda_{33}$–$\lambda_{40}$ onto line 1205.

Optical multiplexer 1200 is readily expandable by adding additional combiners and filtering elements.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. An optical device comprising:
   an arrayed waveguide grating (AWG) having an input and a plurality of outputs, said input being configured to be coupled to an optical communication path carrying a plurality of first optical channels, each at a respective wavelength, said arrayed waveguide grating supplying a respective one of a plurality of second optical channels selected from said plurality of first optical channels, and undesired optical signals at each of said plurality of outputs; and
   a plurality of filtering elements each having an input port coupled to a respective one of said plurality of outputs of said arrayed waveguide grating and an output port decoupled from the input of said arrayed waveguide grating, each of said plurality of filtering elements supplying said respective one of said plurality of second optical channels at said output port while reducing said undesired optical signals.

2. An optical device comprising:

an arrayed waveguide grating (AWG) having an input and a plurality of outputs, said input being configured to be coupled to an optical communication path carrying a plurality of first optical channels, each at a respective wavelength, said arrayed waveguide grating supplying a respective one of a plurality of second optical channels selected from said plurality of first optical channels, and undesired optical signals at each of said plurality of outputs; and a plurality of filtering elements each having an input port coupled to a respective one of said plurality of outputs of said arrayed waveguide grating and an output port, each of said plurality of filtering elements supplying said respective one of said plurality of second optical channels at said output port while reducing said undesired optical signals, wherein each said plurality of filtering elements comprises:

an optical coupler having a first port coupled to said input port, a second port and a third port;

a Bragg grating coupled to said second port of said optical coupler, said Bragg grating receiving said respective one of said plurality of second optical channels via said first and second ports and reflecting said respective one of said plurality of second optical channels back to said second port of said optical coupler for output through said third port of said optical coupler.

3. An optical device comprising:

an arrayed waveguide grating (AWG) having an input and a plurality of outputs, said input being configured to be coupled to an optical communication path carrying a plurality of first optical channels, each at a respective wavelength, said arrayed waveguide grating supplying a respective one of a plurality of second optical channels selected from said plurality of first optical channels, and undesired optical signals at each of said plurality of outputs; and a plurality of filtering elements each having an input port coupled to a respective one of said plurality of outputs of said arrayed waveguide grating and an output port, each of said plurality of filtering elements supplying said respective one of said plurality of second optical channels at said output port while reducing said undesired optical signals, wherein each of said filtering elements comprises an in-fiber Bragg grating.

4. An optical demultiplexer, comprising:

an optical circulator having a plurality of ports, a first one of said plurality of ports being coupled to an optical communication path, said optical communication path carrying a plurality of optical channels, each at a respective wavelength;

a Bragg grating coupled to a second one of said plurality of ports, said Bragg grating being configured to have a transmissivity characteristic whereby a group of optical channels selected from said plurality of optical channels is transmitted through said Bragg grating and a remaining group of said plurality of optical channels is reflected back to said second one of said plurality of ports, said remaining group of said plurality of optical channels being output through a third one of said plurality of ports;

a sub-demultiplexer having an input coupled to said Bragg grating and a plurality of outputs, said sub-demultiplexer supplying adjacent ones of said optical channels within said selected group on respective ones of said plurality of outputs.

5. An optical demultiplexer in accordance with claim 4, further comprising:

a plurality of said Bragg gratings each coupled to a respective one of said plurality of ports, each of said Bragg gratings being configured to have respective transmissivity characteristics whereby a respective group of optical channels selected from said plurality of optical channels is transmitted through a corresponding one of said Bragg gratings and remaining respective groups of said plurality of optical channels are reflected back to corresponding ones of said plurality of ports, said remaining groups of said plurality of optical channels being output through corresponding ones of said plurality of ports;

a plurality of said sub-demultiplexers each having an input coupled to a respective one of said Bragg gratings and each having a plurality of outputs, each of said sub-demultiplexers supplying adjacent ones of said optical channels within said selected group on respective ones of said plurality of outputs.

6. An optical demultiplexer in accordance with claim 4, wherein said sub-demultiplexer includes a plurality of cascaded Mach-Zehnder interferometers.

7. An optical demultiplexer in accordance with claim 4, wherein said sub-demultiplexer includes an arrayed waveguide grating.

8. An optical demultiplexer in accordance with claim 4, wherein said sub-demultiplexer includes a plurality of fiber optic couplers.

9. An optical device, comprising:

an optical splitter having an input and first and second outputs, said input for coupling to an input optical path, said input optical path carrying a plurality of optical channels, each of said plurality of optical channels having a respective wavelength, said first output being coupled to a first output optical path, and said second output being coupled to a second output optical path, said first and second output optical paths carrying said plurality of optical channels;

a first optical filtering element coupled to said first output optical path, said first optical filtering element selecting a first group of said plurality of optical channels, said first group of optical channels being supplied on a first common output;

a second plurality of optical filtering elements coupled to said second output optical path, said second plurality of optical filtering elements respectively selecting second groups of said plurality of optical channels, said first group of optical channels being different than said second groups of optical channels, each of said second groups of optical channels being supplied on a corresponding one of a second plurality of common outputs, each of said second plurality of common outputs being associated with a respective one of said second plurality of optical filtering elements;

a first sub-demultiplexer coupled to said first common output, said first sub-demultiplexer having a plurality of outputs, each presenting a respective channel associated with said first group of said plurality of channels; and a second plurality of sub-demultiplexers respectively coupled to each of said second plurality of common outputs associated with each of said second plurality of filtering elements, each of said second plurality of sub-demultiplexers having a plurality of outputs, each presenting a respective channel associated with a corresponding one of said second groups of plurality of channels.

10. An optical device in accordance with claim 9, wherein said optical splitter comprises a waveguide doped with an optically active material.

11. An optical device in accordance with claim 9, wherein said splitter is a first splitter and at least one of said second optical filtering elements has an output port for outputting one of said second groups of said plurality of optical channels, at least one of said second plurality of sub-demultiplexers comprising:
  a second splitter having an input coupled to said output port and a plurality of outputs; and
  a plurality of optical selectors, each respectively coupled to a corresponding one of said plurality of outputs of said second splitter, each optical selector outputting at least a corresponding one of optical channels within said one of said second groups of said plurality of optical channels.

12. An optical device in accordance with claim 11, wherein said second splitter comprises an optical waveguide doped with an optically active material.

13. An optical device in accordance with claim 11, wherein each of said plurality of optical selectors comprises:
  an optical circulator having a first port coupled to a corresponding one of said plurality of outputs of said second splitter, a second port, and a third port, said one of said second groups of said plurality of optical channels being received at said first port and being directed toward said second port;
  a Bragg grating coupled to said second port having a first reflectivity at a wavelength associated with an optical channel within said one of said second groups of said plurality of optical channels greater than a second reflectivity associated with remaining optical channels of said one of said second groups of said plurality of optical channels, said one of said second groups of said plurality of optical channels being output from said second port and supplied to said Bragg grating, said Bragg grating substantially reflecting said optical channel back to said second port while substantially transmitting said remaining channels of said one of said second groups of said plurality of optical channels; and
  a photodetector coupled to said third port, said one of said first group of channels being directed from said second port to said third port, said photodetector sensing said optical channel output from said third port.

14. An optical device in accordance with claim 13, wherein each of said plurality of optical selectors comprises a feedback circuit coupled to said Bragg grating for adjusting said in-Bragg grating to have a peak reflectivity at said wavelength.

15. An optical device in accordance with claim 9, wherein at least one of said second plurality of optical sub-demultiplexers further comprising a plurality of selectors, each of which is respectively coupled to a corresponding one of said plurality of outputs of said second plurality of filtering elements, each of said plurality of selectors comprising:
  an optical coupler having a first port coupled to said corresponding one of said plurality of outputs of said at least one of said second plurality of optical sub-demultiplexers, a second port and a third port;
  a Bragg grating coupled to said second port of said optical coupler, said Bragg grating receiving one of said second groups of said plurality of optical channels via said first and second ports and reflecting an optical channel within said one of said second groups of said plurality of optical channels back to said second port of said optical coupler; and
  a photodetector coupled to said third port of said optical coupler, said optical coupler transmitting said corresponding one of said second groups of said plurality of optical channels through said third port to said photodetector, said photodetector sensing said optical channel.

16. An optical device in accordance with claim 15, wherein each of said plurality of selectors comprises a feedback circuit coupled to said Bragg grating for adjusting said Bragg grating to have a peak reflectivity at a wavelength associated with said optical channel.

17. An optical device in accordance with claim 9, wherein said first and second output optical paths are configured to accommodate additional filtering elements.

18. An optical device in accordance with claim 9, wherein said first filtering element and said second plurality of filtering elements comprise interference filters.

19. An optical device in accordance with claim 9, wherein said first filtering element and said second plurality of filtering elements comprise a plurality of optical circulators each respectively coupled to a corresponding one of a plurality of Bragg gratings.

20. An optical device in accordance with claim 9, further comprising an optical amplifier coupled to said input of said optical splitter.

21. An optical device in accordance with claim 9, wherein said first sub-demultiplexer and said second plurality of sub-demultiplexers include a plurality of cascaded Mach-Zehnder interferometers.

22. An optical device in accordance with claim 9, wherein said first sub-demultiplexer and said second plurality of sub-demultiplexers include a plurality of arrayed waveguide gratings.

23. An optical device in accordance with claim 9, wherein said first and second pluralities of sub-demultiplexers include a plurality of fiber optic couplers.

24. An optical device in accordance with claim 1, wherein the input to said arrayed waveguide grating consists of a single input.

25. An optical device in accordance with claim 1, further comprising:
  a plurality of photodetectors respectively coupled to the output ports of said filtering elements, each of said photodetectors sensing said respective one of said plurality of second optical channels.

* * * * *